US012192729B2

(12) United States Patent
Lai et al.

(10) Patent No.: US 12,192,729 B2
(45) Date of Patent: Jan. 7, 2025

(54) SPEAKER

(71) Applicant: Merry Electronics (Shenzhen) Co., Ltd., ShenZhen (CN)

(72) Inventors: Tsai Ti Lai, Taichung (TW); Tsung-Lung Chang, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 214 days.

(21) Appl. No.: 18/088,610

(22) Filed: Dec. 25, 2022

(65) Prior Publication Data

US 2024/0163613 A1 May 16, 2024

(30) Foreign Application Priority Data

Nov. 14, 2022 (TW) ................................. 111143314

(51) Int. Cl.
*H04R 9/06* (2006.01)
*H04R 9/02* (2006.01)
*H04R 9/04* (2006.01)

(52) U.S. Cl.
CPC ............ *H04R 9/025* (2013.01); *H04R 9/046* (2013.01); *H04R 9/06* (2013.01)

(58) Field of Classification Search
CPC ........... H04R 9/025; H04R 9/046; H04R 9/06
See application file for complete search history.

(56) References Cited

U.S. PATENT DOCUMENTS

2006/0008109 A1* 1/2006 Huang .................. H04R 25/00 381/396
2011/0044491 A1* 2/2011 Ku .......................... H04R 9/06 381/433
2016/0057543 A1* 2/2016 Salvatti .................. H04R 9/04 381/398
2017/0245057 A1* 8/2017 Grazian .................. H04R 9/06

* cited by examiner

*Primary Examiner* — Suhan Ni
(74) *Attorney, Agent, or Firm* — JCIPRNET

(57) ABSTRACT

A speaker includes a frame, a magnetic circuit system setting section, a magnetic circuit system and a balance element. The frame has a first surface. The magnetic circuit system setting section is formed on the first surface of the frame, the magnetic circuit system setting section includes a first region and a second region, and the second region surrounds the first region. The magnetic circuit system is arranged in the magnetic circuit system setting section, and includes a voice coil. The voice coil has a first end facing the first surface and located in the second region. The balance element is connected to the first surface and the first end.

7 Claims, 7 Drawing Sheets

SPEAKER

CROSS-REFERENCE TO RELATED APPLICATION

This application claims the priority benefit of Taiwanese application no. 111143314, filed on Nov. 14, 2022. The entirety of the above-mentioned patent application is hereby incorporated by reference herein and made a part of this specification.

BACKGROUND

Technical Field

The present disclosure relates to a speaker, and in particular to a speaker including a magnetic circuit system.

DESCRIPTION OF RELATED ART

Generally speaking, the speaker can make the diaphragm vibrate through the movement of the voice coil under the action of electromagnetic force, and then emit sound. However, when it comes to higher power, the displacement range of the voice coil increases, which may cause a side-to-side shaking situation, making it difficult to move up and down stably, which will affect the quality of the treble.

SUMMARY

The disclosure provides a speaker which can improve the movement stability of a voice coil.

The speaker of the present disclosure includes a frame, a magnetic circuit system disposing portion, a magnetic circuit system and a balance element. frame has a first surface. The magnetic circuit system disposing portion is formed on the first surface of the frame, the magnetic circuit system disposing portion includes a first region and a second region, and the second region surrounds the first region. The magnetic circuit system is disposed in the magnetic circuit system disposing portion, and includes a voice coil, and the voice coil has a first end facing the first surface and aligned with the second region. The balance element is connected to the first surface and the first end.

In an embodiment of the present disclosure, the speaker further includes a diaphragm, the voice coil has a second end opposite to the first end, the second end is further away from the first surface than the first end is, and the diaphragm is connected to the frame and the second end of the voice coil.

In an embodiment of the present disclosure, the magnetic circuit system further includes a magnet, and the magnet is disposed on the first surface and aligned with the first region.

In an embodiment of the present disclosure, the balance element includes a deforming portion and a fixing portion, and the deforming portion surrounds and is connected to a perimeter of the fixed portion.

In an embodiment of the present disclosure, the fixing portion is located between the magnet and the first surface.

In an embodiment of the present disclosure, the balance element further includes a supporting portion, the supporting portion is located at another end of the deforming portion connected to the fixing portion, and the balance element is connected to the first end of the voice coil through the supporting portion.

In an embodiment of the present disclosure, the deforming portion includes a plurality of concave portions and a plurality of convex portions, and each of the concave portions and each of the convex portions are spaced apart from each other.

In an embodiment of the present disclosure, in a first axial direction, the deforming portion overlaps an outer edge of the magnet.

In an embodiment of the present disclosure, in a second axial direction perpendicular to the first axial direction, the fixing portion overlaps a bottom surface of the magnet.

In an embodiment of the present disclosure, the deforming portion is in a wavy shape or an irregular shape in the second axial direction.

Based on the above, in the speaker of the present disclosure, the balance element is disposed between the first surface of the frame and the first end of the voice coil, so that the moving path of the voice coil can be stabilized, and swinging of the voice coil from left to right can be avoided, thereby achieving effect of stabilizing treble quality.

In order to make the above-mentioned features and advantages of the present disclosure more comprehensible, the following specific embodiments are described in detail together with the accompanying drawings.

DESCRIPTION OF THE EMBODIMENTS

Figure 1:
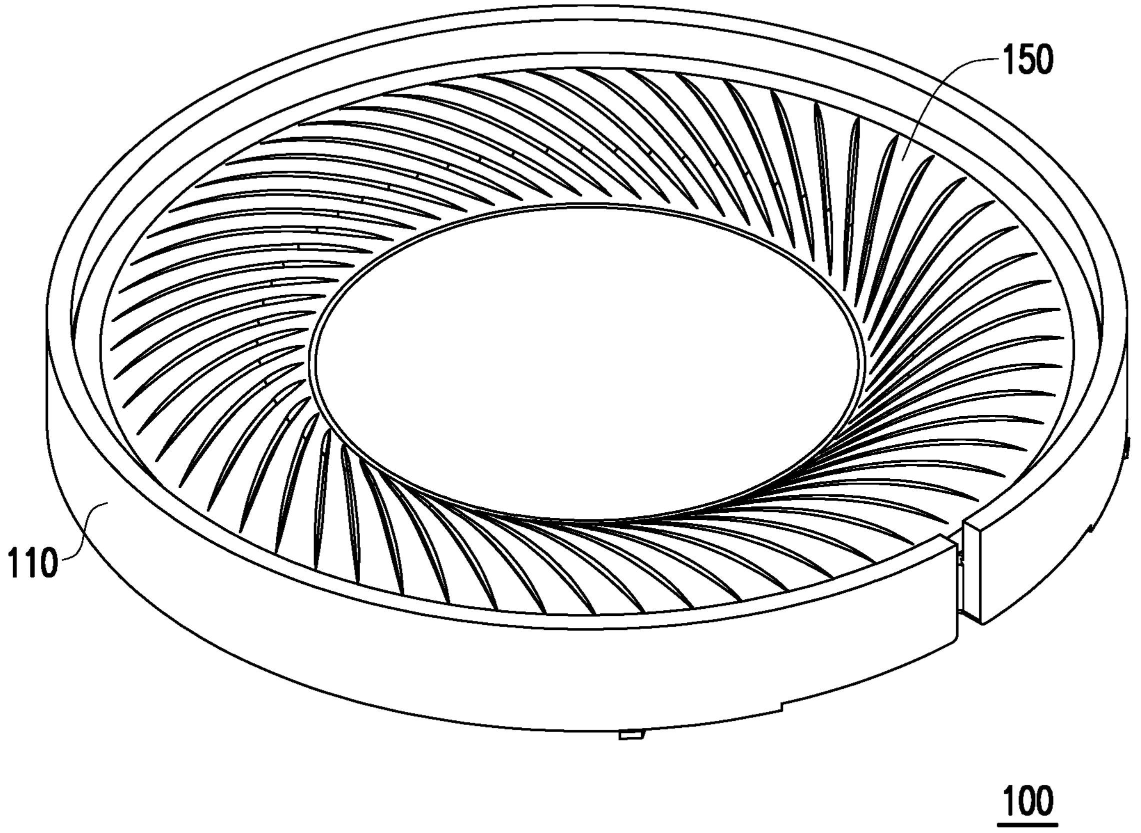
FIG. 1 is a schematic perspective view of a speaker according to an embodiment of the present disclosure.
Figure 2:
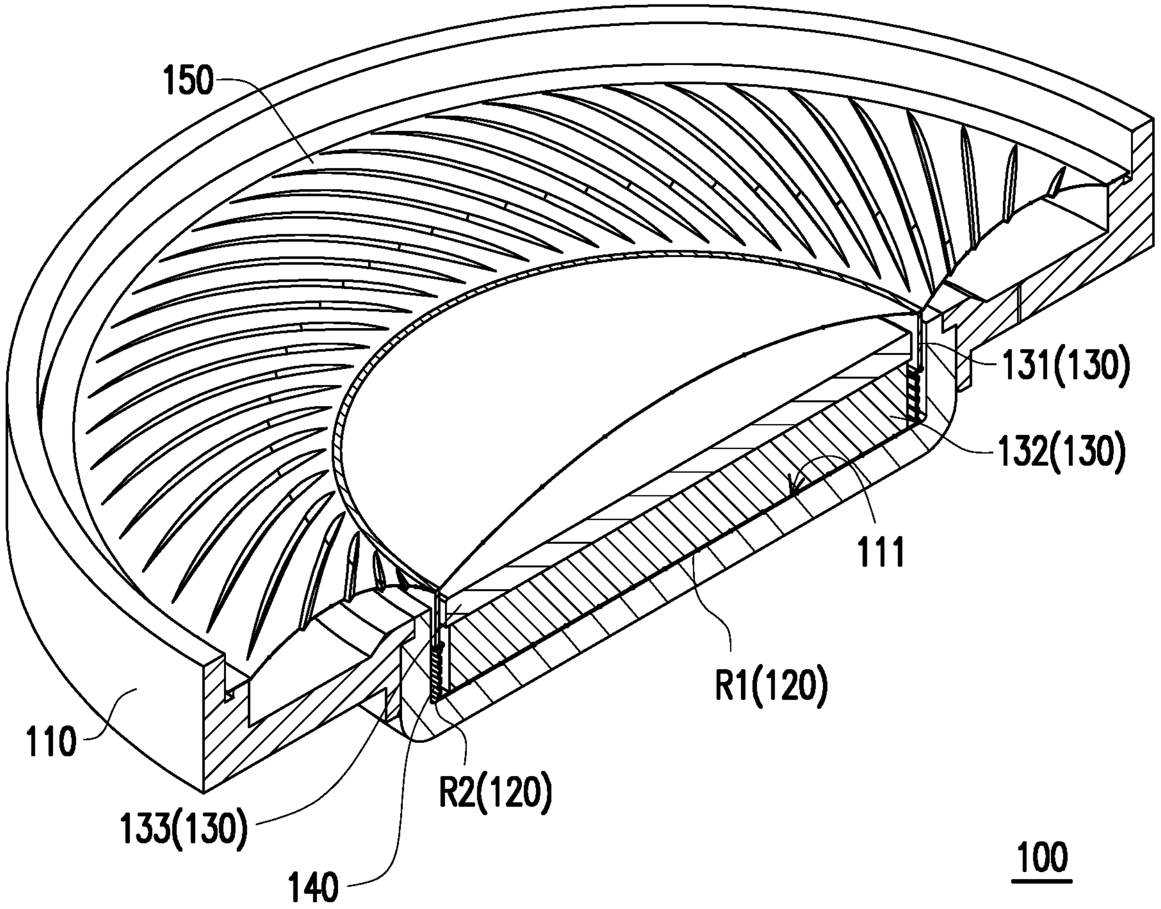
FIG. 2 is a schematic three-dimensional cross-sectional view of the speaker in FIG. 1.
Figure 3A:
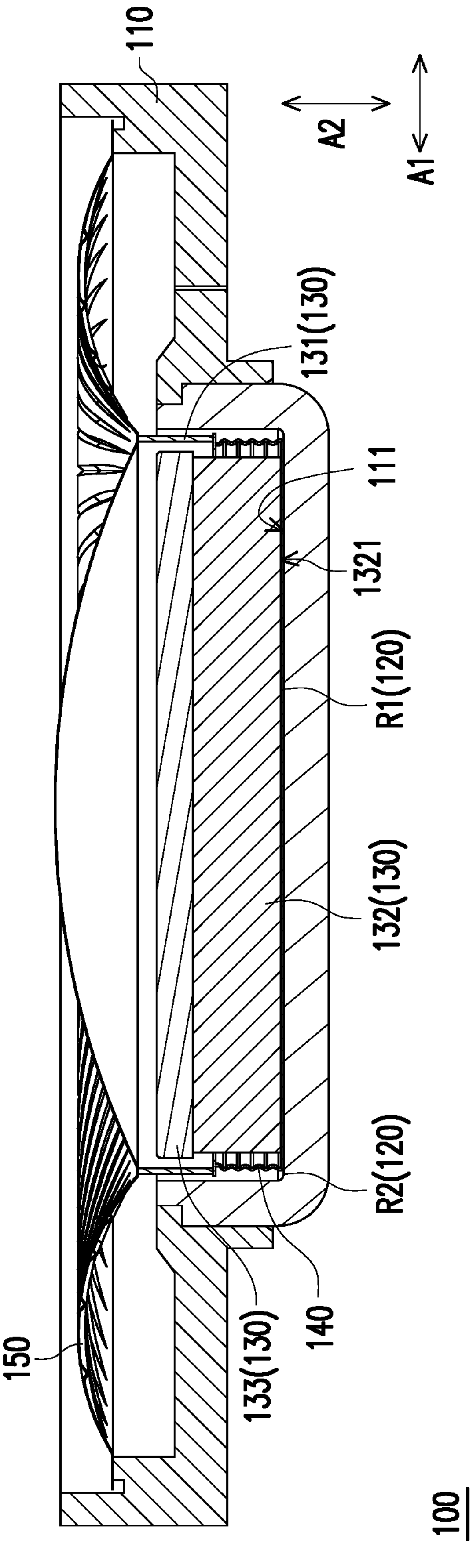
FIG. 3A is a schematic cross-sectional view of the speaker in FIG. 1.
Figure 3B:
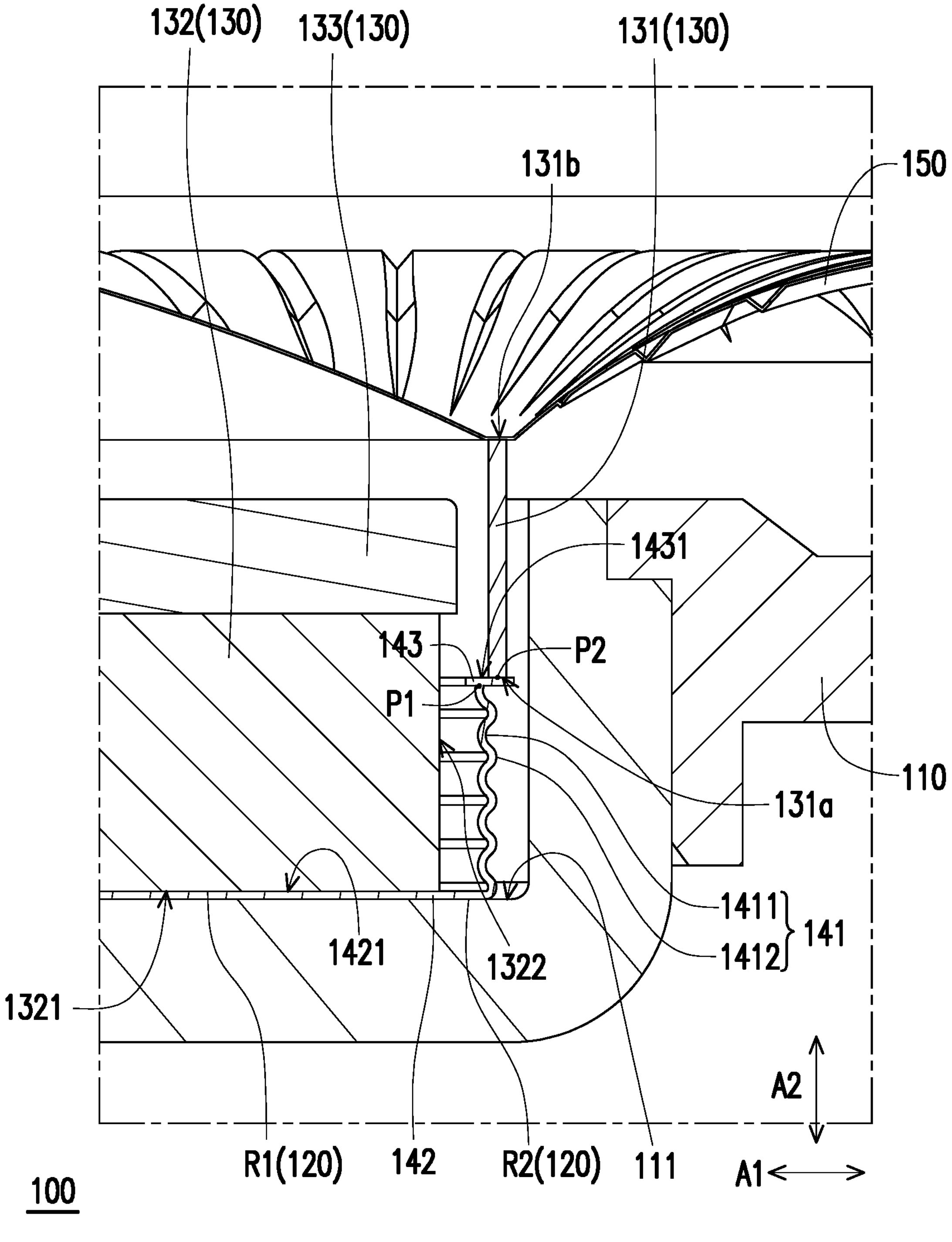
FIG. 3B is a partially enlarged schematic cross-sectional view of the speaker in FIG. 2A.

FIG. 1 is a schematic perspective view of a speaker according to an embodiment of the present disclosure. FIG. 2 is a schematic three-dimensional cross-sectional view of the speaker in FIG. 1. FIG. 3A is a schematic cross-sectional view of the speaker in FIG. 1. FIG. 3B is a partially enlarged schematic cross-sectional view of the speaker in FIG. 2A. Please refer to FIG. 1 to FIG. 3B, the speaker 100 of the present embodiment includes a frame 110, a magnetic circuit system disposing portion 120, a magnetic circuit system 130, a balance element 140 and a diaphragm 150. Herein, the material of the frame 110 includes metal. The speaker 100 of the present embodiment can be applied to headphones, but the applications of technical fields and devices are not limited thereto.

In this embodiment, the frame 110 has a first surface 111, and the first surface 111 is, for example, an inner surface of the frame 110. The magnetic circuit system disposing portion 120 is formed on the first surface 111 of the frame 110, the magnetic circuit system disposing portion 120 includes a first region R1 and a second region R2, and the second region R2 surrounds the first region R1. The magnetic circuit system 130 is disposed in the magnetic circuit system disposing portion 120, and includes a voice coil 131. The voice coil 131 has a first end 131*a* facing the first surface 111 and being aligned with the second region R2. The balance element 140 is connected to the first surface 111 and the first end 131*a*.

In this embodiment, the voice coil 131 has a second end 131*b* opposite to the first end 131*a*, the second end 131*b* is further away from the first surface 111 than the first end 131*a* is, and the diaphragm 150 is connected to the frame 110 and the second end 131*b* of the voice coil 131.

In this embodiment, the magnetic circuit system 130 further includes a magnet 132 and a polar piece 133, the magnet 132 is disposed on the first surface 111, aligned with the first region R1, and is located between the diaphragm 150 and the first surface 111. The polar piece 133 is disposed on the magnet 132. A projection region of the magnet 132 on the first surface 111 is surrounded by a projection region of the voice coil 131 on the first surface 111. Under the effect of the magnetic field of the magnet 132 with the polar piece 133, the voice coil 131 is driven to move, so the diaphragm 150 connected to the voice coil 131 also moves accordingly, which drives the air around the diaphragm 150 to vibrate and make sound.

In this embodiment, the balance element 140 includes a deforming portion 141, a fixing portion 142 and a supporting portion 143. The deforming portion 141 surrounds and connects to a perimeter of the fixing portion 142. The fixing portion 142 is located between the magnet 132 and the first surface 111. The supporting portion 143 is located at another end of the deforming portion 141 connected to the fixing portion 142, and the balance element 140 is connected to the first end 131*a* of the voice coil 131 through the supporting portion 143.

In this embodiment, the deforming portion 141 overlaps an outer edge 1322 of the magnet 132 in a first axial direction A1. In a second axial direction A2 perpendicular to the first axial direction A1, the fixing portion 142 overlaps a bottom surface 1321 of the magnet 132.

In this embodiment, a projection region of the supporting portion 143 on the first surface 111 completely covers a projection region of the deforming portion 141 on the first surface 111, but the present disclosure is not limited thereto.

Figure 4A:
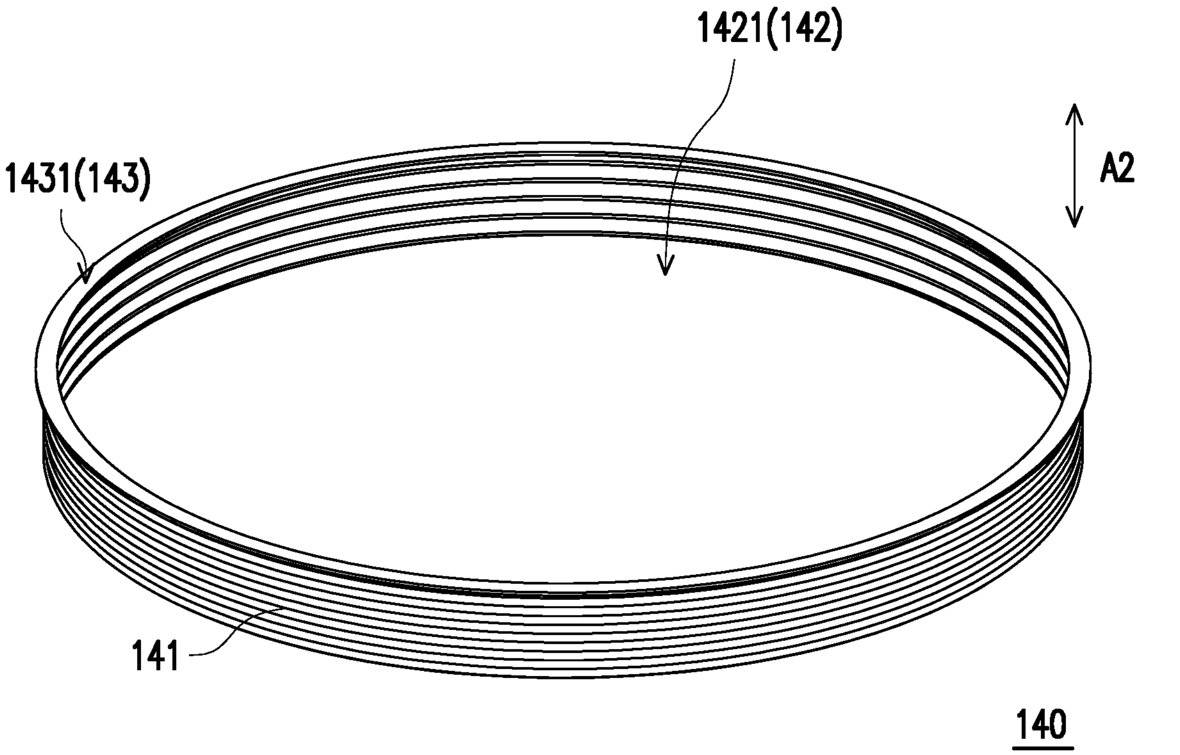
FIG. 4A is a three-dimensional schematic diagram of a balance element of the speaker in FIG. 1.
Figure 4B:
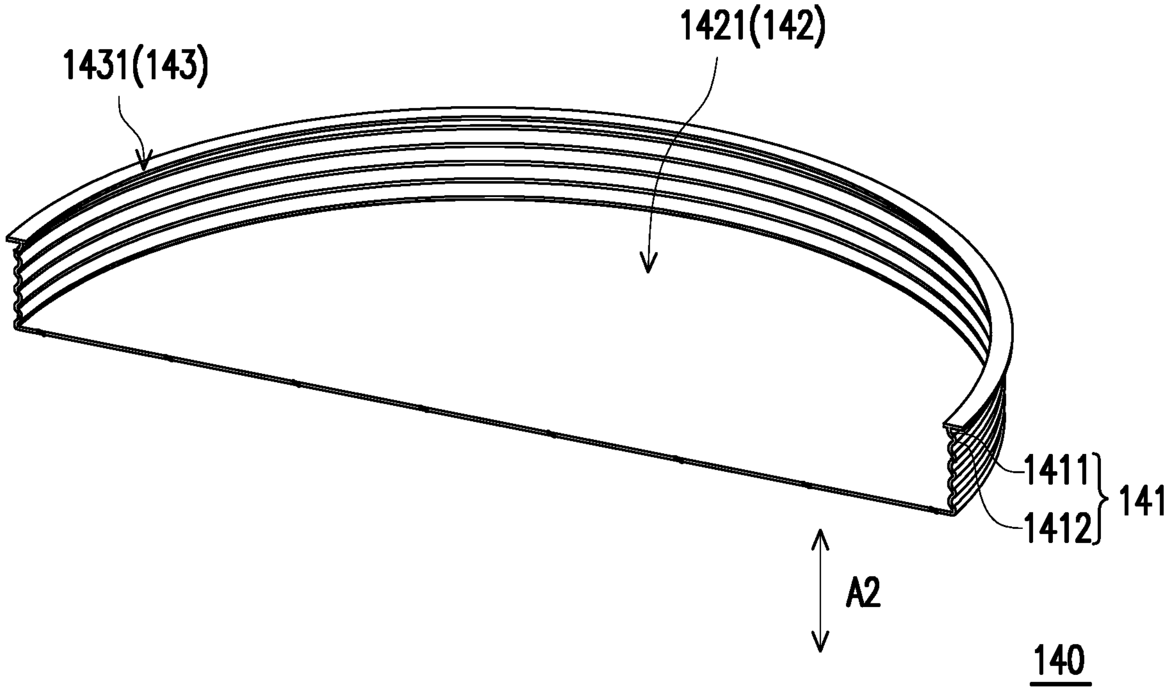
FIG. 4B is a schematic three-dimensional cross-sectional view of the balance element shown in FIG. 4A.

FIG. 4A is a three-dimensional schematic diagram of a balance element of the speaker in FIG. 1. FIG. 4B is a schematic three-dimensional cross-sectional view of the balance element in FIG. 4A. In this embodiment, the fixing portion 142 includes a first plane 1421, and the supporting portion 143 includes a second plane 1431. The first plane 1421, the second plane 1431 and the bottom surface 1321 of the magnet 132 are parallel to each other.

With such configuration, when the magnetic circuit system 130 activates and drives the voice coil 131 to move, the deforming portion 141 of the balance element 140 can be compressed or stretched according to the movement of the voice coil 131. Since the balance element 140 is fixed to the first end 131*a* of the voice coil 131, it can restrict the voice coil 131 to move solely in a vertical direction without horizontal swinging, and without affecting original path of vertical movement of the voice coil 131. In this way, the effect of stabilizing the voice coil 131 can be achieved through the connection relationship between the supporting portion 143 of the balance element 140 and the voice coil 131, so as to avoid unexpected wobbling of the voice coil 131, thereby avoiding a sensitivity decrease in high frequency.

More specifically, in this embodiment, the deforming portion 141 includes a plurality of concave portions 1411 and a plurality of convex portions 1412, and each concave portion 1411 and each convex portion 1412 are disposed alternately with each other.

In one embodiment, the deforming portion 141 is in a wavy shape or an irregular shape in the second axial direction A2, but the present disclosure is not limited thereto.

In this embodiment, the material of the balance element 140 is, for example, paper, foam, composite material or plastic polymer, etc., and the present disclosure is not limited thereto. In this embodiment, the deforming portion 141, the fixing portion 142 and the supporting portion 143 are, for example, integrally formed, but the present disclosure is not limited thereto.

Please refer to FIG. 3B, in this embodiment, in the first axial direction A1, comparing to the connection P2 between the voice coil 131 and the supporting portion 143, the connection P1 between the deforming portion 141 and the supporting portion 143 is closer to the outer edge 1322 of the magnet 132, but the present disclosure is not limited thereto. In addition, in one embodiment, in the second axial direction A2, the projection region of the voice coil 131 on the first surface 111 and the projection region of the deforming portion 141 on the first surface 111 are staggered from each other, but the present disclosure is not limited thereto.

In one embodiment, simulation software (such as COMSOL) may further be used to simulate the effect on the frequency response curve and radial amplitude when the speaker 100 configuring with the balance element 140 swings during up and down movement of the voice coil 131, but the present disclosure is not limited thereto.

Figure 5:
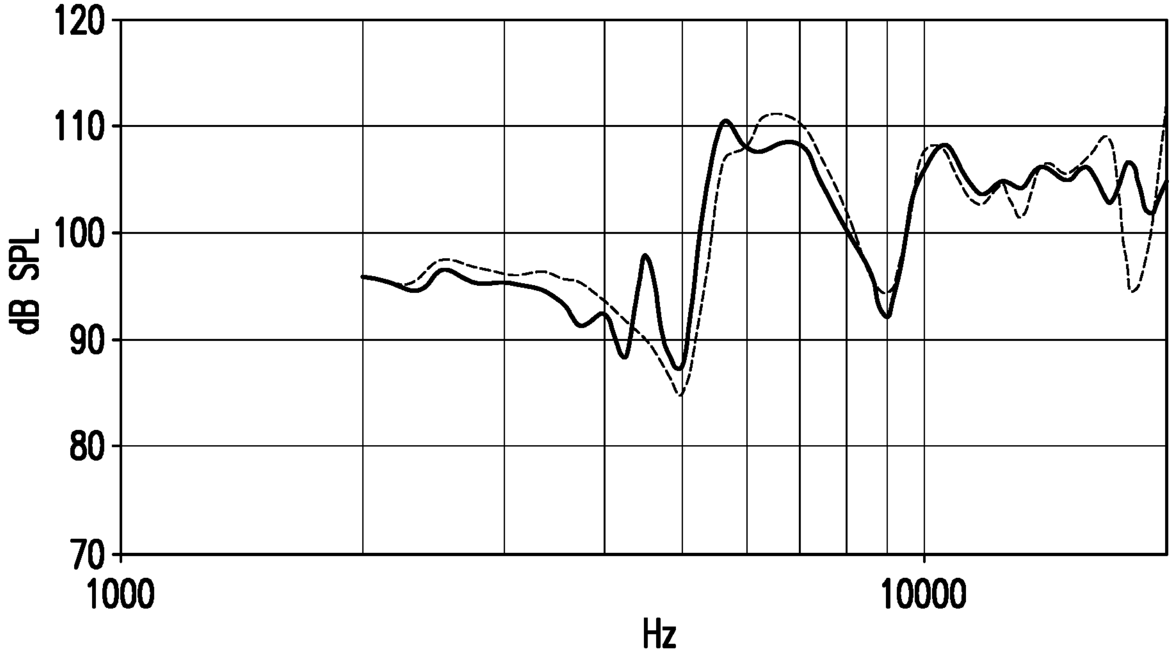
FIG. 5 is a schematic diagram of a frequency response simulation curve of the voice coil in FIG. 1.

Specifically, FIG. 5 is a schematic diagram of a frequency response simulation curve of the voice coil in FIG. 1. Please refer to FIG. 5, the dotted curve in FIG. 5 illustrates a simulated frequency response curve when swinging occurs during the up and down movement of the voice coil 131. The solid curve in FIG. 5 is the frequency response curve after the balance element 140 is added. It can be known from the simulation experiment that the frequency response curve becomes relatively smoother under the effect of the balance element 140 for the high frequency response after 10000 Hz, but the present disclosure is not limited thereto.

Figure 6:
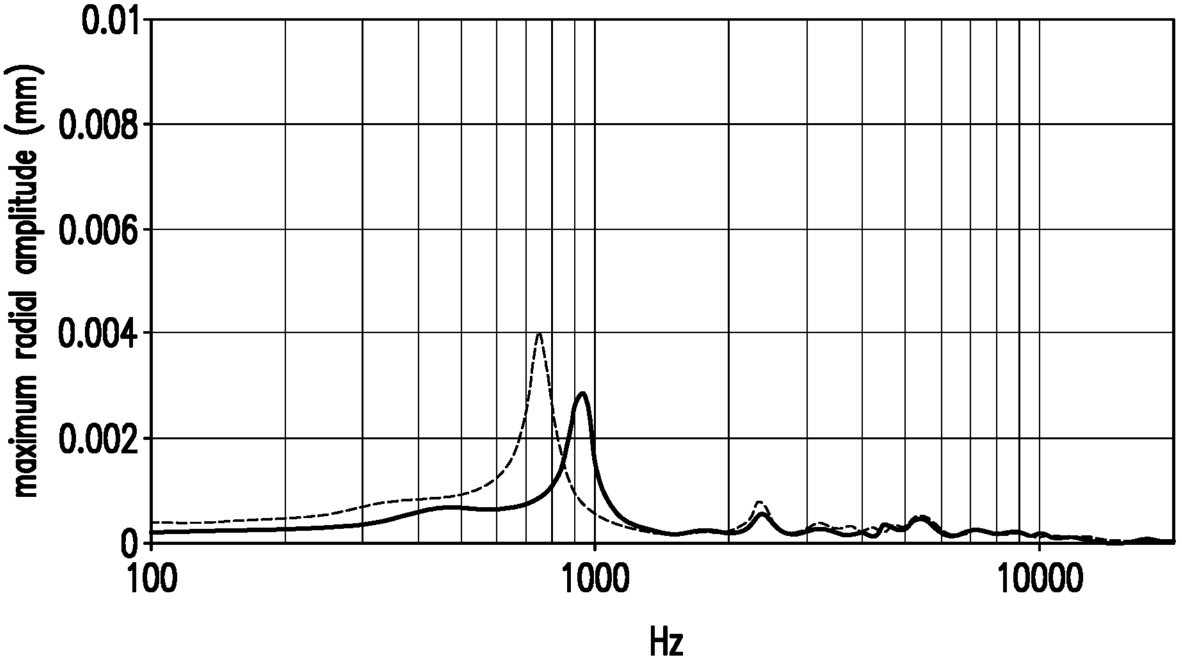
FIG. 6 is a schematic diagram of the maximum radial amplitude vs. frequency simulation curve of the voice coil in FIG. 1.

FIG. 6 is a schematic diagram of the maximum radial amplitude vs. frequency simulation curve of the voice coil in FIG. 1. Please refer to FIG. 6, the dotted curve in FIG. 6 illustrates the simulated curve of maximum radial amplitude vs. frequency when swinging occurs during the up and down movement of the voice coil 131, and the solid curve in FIG. 6 represents the curve of the maximum radial amplitude after the balance element 140 is added. It can be known from the simulation experiment that the swing amplitude is reduced under the effect of the balance element 140 for the medium frequency of Hz to 1000 Hz, but the present disclosure is not limited thereto.

To sum up, in the speaker of the present disclosure, when the magnetic circuit system is functioning (activating), the deforming portion of the balance element can be compressed or stretched according to the movement of the voice coil, so as to achieve the effect of stabilizing the moving path of the voice coil to avoid generating unexpected horizontal wobbling (swinging) of the voice coil in a first axial direction, thereby avoiding sensitivity decreasing on high frequency, and achieving effect of stable quality in treble.

Although the present disclosure has been disclosed above with the embodiments, it is not intended to limit the present disclosure. Anyone with ordinary knowledge in the technical field may make some changes and modifications without departing from the spirit and scope of the present disclosure. The scope of protection of the present disclosure should be defined by the scope of the appended patent application.

What is claimed is:

1. A speaker, comprising:

a frame having a first surface;

a magnetic circuit system disposing portion formed at the first surface of the frame, the magnetic circuit system disposing portion comprising a first region and a second region, and the second region surrounds the first region;

a magnetic circuit system disposed in the magnetic circuit system disposing portion and comprising a voice coil having a first end facing the first surface and aligned with the second region, the magnetic circuit system further comprises a magnet, and the magnet is disposed on the first surface and aligned with the first region; and a balance element connected to the first surface and the first end, the balance element comprises a deforming portion and a fixing portion, and the deforming portion surrounds and is connected to a perimeter of the fixing portion, wherein in a first axial direction, the deforming portion overlaps an outer edge of the magnet.

2. The speaker as claimed in claim 1, further comprises a diaphragm, the voice coil has a second end opposite to the first end, the second end is further away from the first surface than the first end is, and the diaphragm is connected to the frame and the second end of the voice coil.

3. The speaker as claimed in claim 1, wherein the fixing portion is located between the magnet and the first surface.

4. The speaker as claimed in claim 1, wherein the balance element further comprises a supporting portion, the supporting portion is located at another end of the deforming portion connected to the fixing portion, and the balance element is connected to the first end of the voice coil through the supporting portion.

5. The speaker as claimed in claim 1, wherein the deforming portion comprises a plurality of concave portions and a plurality of convex portions, and each of the concave portions and each of the convex portions are disposed alternately with each other.

6. The speaker as claimed in claim 1, wherein in a second axial direction perpendicular to the first axial direction, the fixing portion overlaps a bottom surface of the magnet.

7. The speaker as claimed in claim 6, wherein the deforming portion is in a wavy shape or an irregular shape in the second axial direction.

* * * * *